United States Patent [19]

Katayama

[11] 4,447,736
[45] May 8, 1984

[54] NON SELF-STARTING THERMAL MAGNETIC ENERGY RECYCLING FERRITE RING ENGINE

[76] Inventor: Aisuke Katayama, 2-47, Mutsumimachi, Kawamoto, Akita-shi, Akita, Japan

[21] Appl. No.: 413,706

[22] Filed: Sep. 1, 1982

[30] Foreign Application Priority Data

Sep. 2, 1981 [JP] Japan .................................. 56-137054

[51] Int. Cl.$^3$ ............................................. H02N 10/00
[52] U.S. Cl. .................................... 290/1 R; 310/306; 310/DIG. 6
[58] Field of Search ........... 290/1 R; 310/306, DIG. 6

[56] References Cited

U.S. PATENT DOCUMENTS

| | | | |
|---|---|---|---|
| 3,500,076 | 3/1970 | Kemenczky | 310/306 |
| 3,593,047 | 7/1971 | Nolta et al. | 310/306 |
| 3,743,866 | 7/1973 | Pirc | 310/306 |
| 3,757,146 | 9/1973 | Love | 310/306 |

Primary Examiner—G. Z. Rubinson
Assistant Examiner—Shelley Wade
Attorney, Agent, or Firm—Robert T. Gammons

[57] ABSTRACT

A fast rotating ferrite ring engine that is started by an external starting motor generates a medium mechanical power continuously. The rotating ferrite ring engine body is composed of thin circular ferrite rings affixed to a nonmagnetic plate connected to external devices necessary for the inventive operations, a heat portion, a magnetic field generator both of which are located in the same place where the rings are passing through, and a cooling portion through which the ferrite rings also are passing and restoring cyclically the heated portion of the rings to the cool state that is magnetizable.

After starting by an external starter motor, the ferrite ring engine is controlled at a constant peripheral velocity $V_O$ by the countertorque of an externally connected electric power generator.

In this state, the magnetic energy which enters into the heat portion is made to $V_O \cdot HB_S \cdot S \cdot (\frac{1}{4}\pi) \cdot 10^{-7}$ (Joule/sec) wherein the magnetization is obtained at the entrance by the magnetic generator located there, and S is the cross section area of the surface layers of the ferrite rings. And the heat power is applied such that in the time elapsing in the heating portion $t_H$ the surface layer temperature raises to near the Curie temperature of the ferrite ring losing the magnetic energy, the mechanical power generated there is $V_O \cdot H \cdot B_S \cdot S(\frac{1}{4}\pi) \cdot 10^{-7}/t_H$ (Watt). As $t_H$ is a fraction of the rotating cycle time, therfore, mechanical power of considerable amount can be obtained continuously from the continuous magnetic potential energy flow in the embodiment of the invention.

2 Claims, 5 Drawing Figures

NON SELF-STARTING THERMAL MAGNETIC ENERGY RECYCLING FERRITE RING ENGINE

BACKGROUND OF THE INVENTION

The invention presented is concerned with a thermomagnetic apparatus which generates medium power by the structure and the substance especially constructed and further, by external but integral control devices annexed.

The thermo-magnetic devices heretofore are used as thermal switch and low power applications. This is because that their operations are slow in nature and mostly discontinuous in their mechanical motions, and further their motion is of the finite stroke type. Many attempts have been made to obtain a continuous operation of these devices, for instance, by chaining, sequencing or using their inertia. Although these devices are approximate to the continuous operation, but the mechanical power delivered is too small for practical usage that these inventions are abandoned as good ideas.

Whereas, the invention herein overcomes the deficiency encountered in the prior inventions by using intentional removal of the self-starting ability of the thermo-magnetic devices, and by setting the thermo-magnetic device so constructed in a controlled high speed rotation.

SUMMARY OF THE INVENTION

An engine body is comprising circular ferrite rings affixed to a nonmagnetic plate, heating and cooling portions separately located, and a magnetic field generator located outside the heating portion. The engine body is connected by a shaft of the nonmagnetic plate to external devices that are prerequisite for the operation of the engine.

The engine body is constructed intentionally lacking the function of self-starting.

Starting by an external starter motor, the circular ferrite rings begin to rotate around through the hot and cool portions cyclically. As soon as the rotating rings enter the state of force generation by the interaction of the magnetic field H and temperature gradient generated in the surface layer of the rotating rings, an external clutch is detached and an external electrical power generator is made to issue a counter-torque that balances the torque generated in the engine, therefore, the acceleration of the engine is suppressed.

Then the ferrite rings rotate with a constant peripheral velocity $V_0$, and magnetic energy recycling occurs. In this state, the magnetic power entering continuously into the entrance of the hot portion is $V_0 M$ wherein M is the surface layer magnetic energy in standstill. This magnetic power is converted to the mechanical power in the portion dipped in the hot water portion. If the averaging time of the surface layer temperature to the Curie point is $t_H$, the mechanical power generated is nearly equal to $V_0 M/t_H$ which is a usable amount powerlevel.

DESCRIPTION OF THE PREFERRED EMBODIMENT

This invention is based on different disciplines, such as magnetism, thermal conduction, dynamics, and control theory, somewhat lengthy explanations are given to understand the basic principles underlying for the invention.

Figure 1:
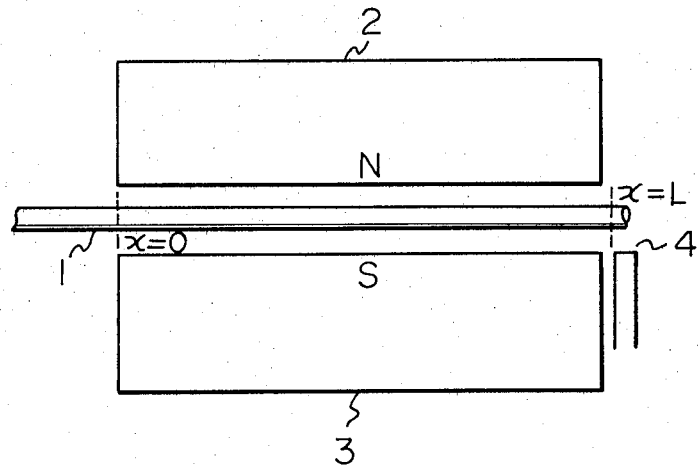
FIG. 1 shows the basic principle of a thermo-magnetic device.

First, a related thermal magnetic device embodied heretofore will be explained. As shown in FIG. 1, a long ferrite rod 1 of the x-direction which is horizontal, and movable only along the x-direction, is suspending in the middle of a constant magnetic field H which is supplied by permanent magnets 2, and 3. The length of the rod 1 is longer than the traverse length of the magnetic field.

When one side of the rod ($x = L$) is heated by a burner 4, and the temperature of the portion attains to the Curie temperature of the ferrite rod, the magnetization there disappears and the induced magnetic density $B_L$ becomes small. While B at nearly inside is not so small, so there generates the gradient $\delta B/\delta x$ which is negative. If the temperature T nearly inside of the rod is lower than the Curie temperature, we can write:

$$\delta B/\delta x = (\delta B/\delta T)\cdot(\delta T/\delta x) \qquad (1)$$

wherein $\delta T/\delta x$ is a positive number in x less than $x = $ because the temperature rises to the Curie temperature $T_Q$ as x increases, so $\delta B/\delta T$ is negative valued and known as a parameter inherent to the ferrite substance used.

In general, the magnetic energy density w of a ferrite body in the magnetic field H is a spatial function and is given by:

$$w = (\tfrac{1}{8}\pi) B \cdot H \, (\mathrm{erg/cm}^3)$$

wherein H is the magnetic field strength in Oersted unit, and B is the magnetic induction density in gauss unit. In what follows, we use these units in magnetism.

When B changes in the x-direction in the near region of $x = L$ as shown in FIG. 1, w also changes in the same direction. It should be mentioned that these changes are decreasing.

Therefore, a force per unit volume is generated such that:

$$f_i = -\delta w/\delta x \, (\mathrm{dyne/cm}^3) \qquad (2)$$

since $(\mathrm{erg/cm}^4) = (\mathrm{dyne/cm}^3)$.

If there are no magnetic energy changes in the perpendicular cross sections the area of which is S, the generating force f at x acting on S is given by:

$$f = -S \, (\delta w/\delta x) \, (\mathrm{dyne/cm}) \qquad (3)$$

The total force generating on the ferrite rod is obtained by integrating:

$$F = \int_{x=L-\gamma}^{x=L} f\delta x = W_{x=L-\gamma} - W_{x=L} \quad (4)$$

wherein $\gamma$ is less than L and $W_{x=L-\gamma}$ is the magnetic energy at $x=L-\gamma$ in Sxl volume, while $W_{x=L}$ is that of at $x=L$. $W_{L-x}$ is larger than $W_L$ that is diminished due to temperature rise to the Curie point.

Hence F is nearly equal to:

$$F = S \cdot H \cdot B_S(\tfrac{1}{2}\pi) - S \cdot H \cdot B_L(\tfrac{1}{2}\pi) \quad (5)$$

$$= S \cdot H \cdot B_S(\tfrac{1}{2}\pi)$$

wherein $B_S$ is the saturation induced magnetic density of the ferrite rod when located in the constant magnetic field H at the temperature lower than the Curie temperature of the ferrite.

Thus, when a heating is applied to one end of the ferrite rod which has been in standstill, it is accelerated by the force mentioned in the above (5), and it moves in the x-direction. However, it stops after a short stroke.

This is due to the fact that the temperature of the new rod portion upon the burner after the stroke can not rise instantly to almost the Curie temperature, because of thermal delay which relates to the thermal conductivity and capacity of the ferrite material and to the size of the rod.

Only after some time delay, the rod is reaccelerated and moves a short stroke.

This discontinuity of the stroke is a deficiency of the prior thermo-magnetic devices.

However, these devices have the feature of self-starting when heated, so they are used as the temperature-sensitive switch and the like. Some attempts for thermal rotating machinery using magnetism have been performed, but they fail to deliver a useful level of mechanical power due to remaining in the finite stroke method refinement.

BASIC PRINCIPLE OF THE INVENTION

Figure 2:
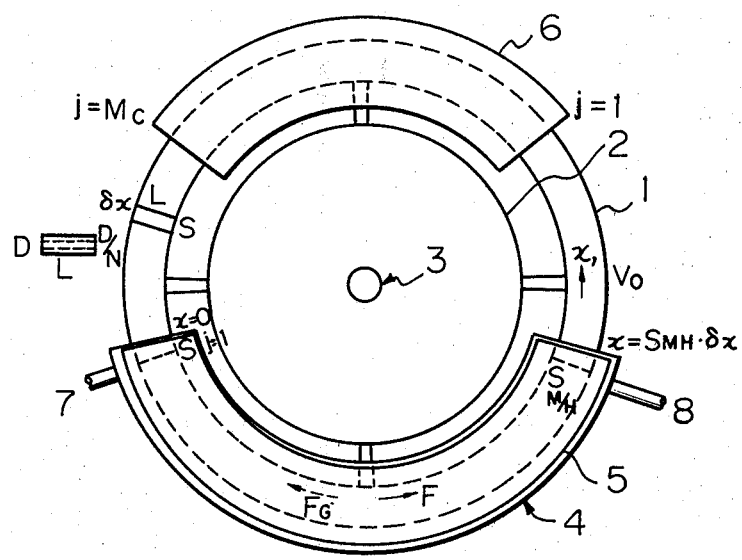
FIG. 2 shows the basic construction of the invention body.

This invention overcomes the abovementioned difficulties in the prior thermo-magnetc devices. It can generate a medium level and continuous mechanical power from the high speed change of the magnetic energy by using low temperature heat power. FIG. 2 illustrates the basic principles used in the embodiment of the present invention.

In FIG. 2, a circular thin ferrite ring 1 is affixed to a circular plate 2 whose center is connected to a shaft 3. A heating portion 4 where a magnetic field generator is also provided close to a magnetic pole indicated by 5, and a cooling portion 6 are located separately in the rotating path way of the ferrite ring 1.

It is the distinctive feature of the invention to have the circular ferrite ring rotate initially at a constant velocity $V_0$ by an external starter motor affixed to the shaft 3 in the gear down state. Let the peripheral coordinate of the ring denote by x and the direction of x be the same as that of $V_0$.

When the heating and cooling portions are vacant, the rotating ring exerts no force because of the uniformity of the temperature of the ring.

On the other hand, if the heating and cooling portions are filled with flowing hot and cool fluids respectively, the rotating thin ferrite ring has temperature gradients along the circular direction x, that is, where being heated, the ring surface temperature has a positive gradient, and where being cooled, it has a negative gradient, so that, when the magnetic field is applied to the heating portion and the surface temperature of the ferrite attains to its proper Curie point, a force F is exerted along the x-direction, that is, the $V_0$-direction.

While from the shaft 3, an external counterbalance force $F_G$ is applied such that $F+F_G=0$ by a control system affixed, then the acceleration of the ferrite ring disappears, so that the peripheral velocity of the ring is held constant.

Therefore, the temperature gradients generated along the ferrite ring become fixed spatially.

This spatially fixed stationary temperature gradients of the surface layers of the rotating ferrite ring are the origin of the affordable mechanical power generation from a magnetic power feeding by the magnetic field generator.

Henceforth, the rotating ferrite ring affixed with the magnetic field generating scheme, the heating and cooling scheme, and the control scheme is the main embodiment of the invention.

It should be mentioned that, when the ferrite ring is in standstill, there generates no rotation forever, even if heating and cooling power, and the magnetic field are applied, because the temperature of the ring in the heating portion is uniform, and the temperature gradient there is zero, so the magnetic induction gradient does not develop in one direction, therefore, available forces can not be provided. This inability of the self-starting is also the origin of the ability of a medium power generation of the invention.

In what follows, the low temperature heat power is considered, therefore, the fluid used in the decription may be water.

From a hot water reservoir, the flowing hot water with some pressure head enters to the inlet 7 of the heating portion. After giving heat power to the rotating ferrite ring whose Curie point $T_Q$ is lower than the average hot water temperature $T_H$, the flowing hot water leaves from the outlet 8, as shown in FIG. 2.

Referring to FIG. 2, the ring width is L, and the thickness is D. In an incremental time $\delta t$, a fixed line on the ring moves $V_0 \delta t$ which is equal to $\delta x$. Then we have: $V_0 = \delta x / \delta t$.

Consider a small segment S on the ring such as $S = L \delta x D / N$, wherein N is the number of the dividing layers. The subscript j may be affixed to S as $S_j$. The segments of the rotating ferrite ring dipping in the hot water can be represented as $S_{j=1}, \ldots, S_{j=M_H}$, wherein $S_1$ indicates the segment just dipped, while $S_{M_H}$ indicates the segment just left the hot water. The time elapsed in the hot water of a segment S is given by: $M_H \delta t$.

As the segment advances in the hot water, the segment temperature rises. If $S_j$ represents the surface layer segment, and $U_1(j)$ the surface layer temperature at j position respectively, the relationship $U_1(1) < U_1(2) < U_1(M_H)$ is satisfied.

The heat power transferred to the ferrite ring in the hot water can be expressed as follows:

$$P_{HI} = 2 \cdot R1 \sum_{j=1}^{M_H} q_j \quad (6)$$

$$q_j = \delta A \cdot h(T_H - U_1(j)) \quad (7)$$

wherein $q_j$ is the heat power transferred to a segment at j position, $\delta A$ is a surface area of the segment which is equal to L$\delta$x, h is the heat transfer coefficient, and R1 is the rotation number of the ferrite ring per second.

The heat transfer coefficient h is the most important factor in the invention which can be varied by the flow rate and pressure of the hot water, and by the relative speed of the water and the ferrite ring surface. The value of h is ranged from 5000 to 10,000 in Kcal/m$^2$·hr·°C. When h is large, the surface temperature rises fast and the heat power transfer is sufficient.

To determine the temperature distribution of the thin ferrite ring rotating with the constant peripheral speed V$_0$ under the heat and cool cycle operation, it is required to know the thermal conductivity and heat capacity of the ferrite.

They are:
  thermal conductivity = 0.015 (cal/°C·cm·sec)
  heat capacity = 0.96 (cal/°C·cm$^3$
The ferrite ring has:
  diameter = 30 cm, width = 2 cm, thickness = 2 mm,
  rotation per sec = 5 (300 rpm)
The water temperature T$_h$ is 77° C., and T$_c$ is 5° C.; and heat transfer coefficient h is 6000.

Figure 3:
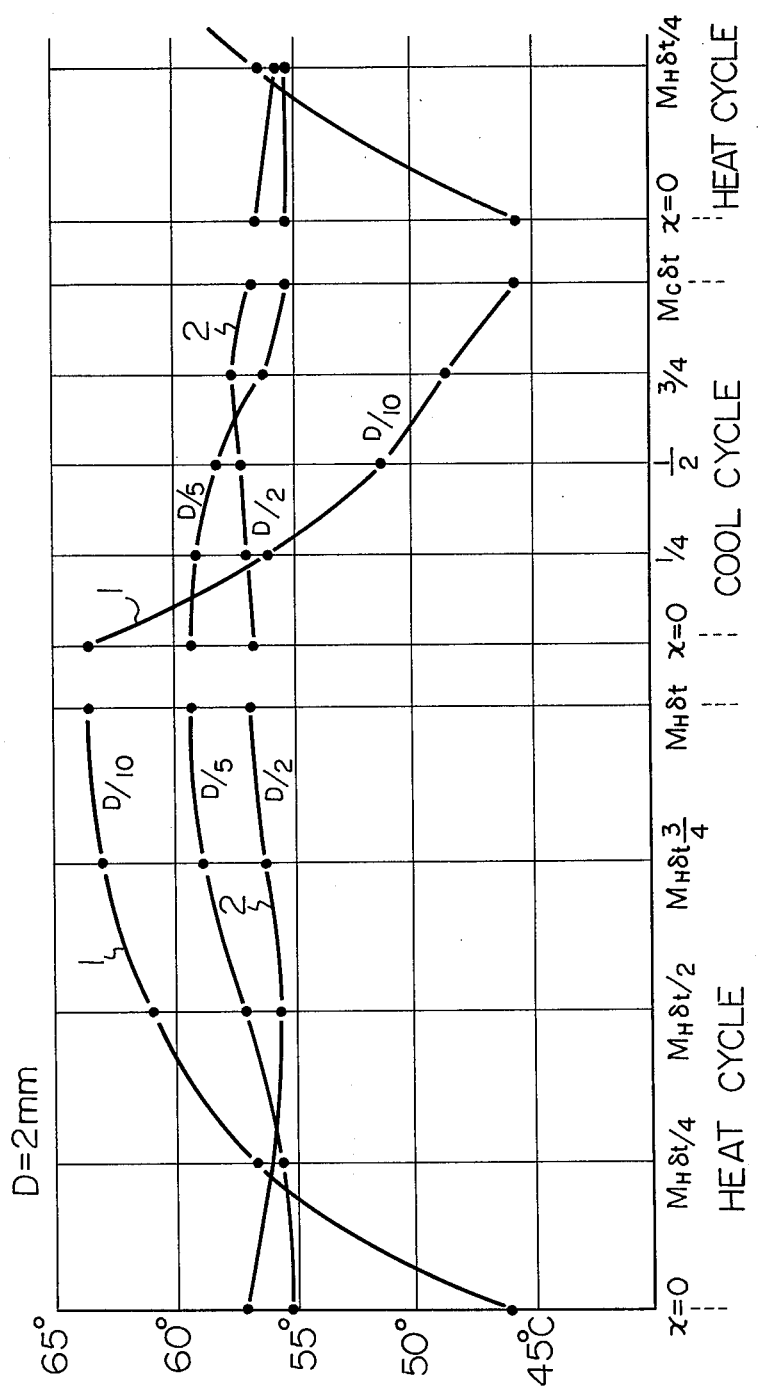
FIG. 3 shows the temperature distributions of several layers of the ferrite ring along the heat and cool cycle in spatial or in time scale, and the velocity of the rotation is held constant so that both scales give the distribution curves. Remark that temperature remains nearly constant in the central layer.

The numerical calculation based on thermal equation with the cyclic heat and cool initial conditions by a computer gives the temperature distribution shown in FIG. 3.

Referring to FIG. 3, the abscissa is in time, but may be considered as a spacial circular coordinate x. The temperature distribution is perfectly stationary after 10 second rotations of the thin ferrite ring. But it should be mentioned that the temperature of the surface layer of a fixed segment is changing rapidly and cyclically. In the figure, 1 is the surface layer temperature variation, and 2 is that of the central layer which changes very slightly.

BASIC PRINCIPLE OF THE POWER GENERATION

The thin ferrite ring that rotates through the hot, and cool portions cyclically wherein the magnetic field is applied only to the hot water portion in which the water temperature T$_H$ is higher than the Curie point T$_Q$ of the ring ferrite, and that affixes to the circular nonmagnetic plate from which shaft torques for starting and supressing the acceleration are applied externally, can be divided into segments S's.

The volume of the segment S is given by L(D/N)·$\delta$x, wherein L(D/N) is the cross section area of the surface layer perpendicular to $\delta$x, and $\delta$x is equal to V$_0\delta$t wherein $\delta$t is the fixed time increment.

The segment S$_j$ represents that in the hot water portion as mentioned previously. S$_j$ is advancing with the peripheral velocity V$_0$. The temperature T$_j$ rises towards T$_Q$ and the magnetic induction density B in the segment of the ferrite surface layer decreases. Therefore, the force f per cm (dyne/cm) which is generated in the segment S$_j$ is given by:

$$f = -S_0(\tfrac{1}{4}\pi)H\cdot\delta B/\delta x \qquad (8)$$

This pressure acts between $\delta$x, so the force f$_j$ generated in the segment S$_j$ is given by:

$$f_j = -S_0\delta x(\tfrac{1}{4}\pi)H\delta B/\delta x \qquad (9)$$
$$= -S_0\delta x(\tfrac{1}{4}\pi)H\delta B/\delta T \cdot \delta T/\delta x$$

wherein S$_0$ is a surface layer cross section area and satisfies S$_0$=L(D/N), and T is the temperature in S$_j$ which should be written as T$_j$.

While the speed of the ferrite ring is held constant, that is, the peripheral speed is V$_0$, by supressing the acceleration, the power generated in S$_j$ is given by the scalar product of (V$_0$·f$_j$), we have:

$$w_j = -S_0\delta x\cdot(\tfrac{1}{4}\pi)H\delta B/\delta T\cdot\delta T/\delta t\cdot\delta t/\delta x\cdot V_0$$

As $\delta x/\delta t = V_0$, so we have:

$$w_j = -S_0\delta x\cdot(\tfrac{1}{4}\pi)\cdot H\delta B/\delta T\cdot\delta T/\delta t\cdot 10^{-7} \text{ (watt)} \qquad (10)$$

Thus the incremental power generated in S$_j$ is obtained.

The segments S$_j$'s are located consecutively and move with the velocity V$_0$, so that total power generated by one ferrite ring can be obtained by summing up the incremental powers.

It should be remarked that the segment power w$_j$ is proportional to the magnetic field H applied externally to the portions of the ferrite rings in the hot water, to the magnetic induction density gradient to temperature which is the ferrite material parameter, and to the temperature rise rate which is capable to vary by the temperature, flow rate, and pressure head of the hot water.

The ferrite ring is composed of segment S$_j$.

The total power generated in the rotating ferrite ring is the product of w$_j$ and the total number of the segments which pass across the hot water portion where the magnetic field also is applied per second.

Hence the total power is given by:

$$W_O = 2\cdot R_1 \sum_{j=1}^{j=M_H} w_j \qquad (11)$$

wherein 2 is due to the fact that both surfaces of the ferrite ring are heated similarly, and R$_1$ is the rotations of the ferrite ring per second.

If there are provided the concentrically located ferrite rings of numbers N$_F$, the total generated power is nearly given by:

$$W = N_F W_0 \qquad (12)$$

The heat power transferred into the portion of the rotating ferrite rings dipping in the hot water is given by:

$$P_{HI} = 2R_1\cdot N_F \sum_{j=1}^{M_H} (T_H - U_1) h\cdot L\delta x \qquad (13)$$

wherein T$_H$ is the flowing water temperature along the surfaces of the rings, U$_1$ is the surface layer temperature that varies along the direction of rotation x, L$\delta$x=$\delta$A is the surface area of the segment S$_j$, and h is the heat transfer coefficient that determines water heat transfer into the ferrite ring surface, or the vice versa.

Similarly, in the cool portion, the heat absorbed in the hot water is extracted from the ring and transferred to the cool water, so the surface layer temperature decreases rapidly in the cool cycle. Therefore, in cool cycle, the surface magnetic state of ferrite rings is restored to be magnetizable but not magnetized there.

The heat extracted in the cool portion is given by:

$$P_{HO} = 2R_1 N_F \sum_{j=1}^{M_C} (U_1(j) - T_C) h L \delta x \qquad (14)$$

wherein $M_C$ is the number of a ferrite ring segment $S_j$, $T_C$ is the cool water temperature, $U_1(j)$ is the surface layer temperature of $S_j$, and h and $L\delta x$ are the same as above.

PHYSICAL EXPLANATION OF THE MECHANICAL POWER GENERATION

Although a formal derivation of the mechanical power has been given previously in (10)–(13), the magneto-thermal schemes heretofore have not yet succeeded to deliver the mechanical power of above 1 KW level in the small scale schemes such as this embodiment of the invention. The origin of the mechanical power of this embodiment is really the magnetic potential energy in the surface layer of the ferrite ring continuously being restored at the entrance of the hot water portion wherein the magnetic field H is also applied.

The recycling of the magnetic potential energy is one kind of positive feed back which is used widely in electrical circuitry.

Consider a segment S used previously in a ferrite ring of the Curie point $T_Q$. When the ring is in standstill, the magnetic potential energy M of S at the entrance of the heat portion is given by $M = \delta x L D / N \cdot (\frac{1}{2}\pi) H B_S \cdot 10^{-7}$ (Joule). However, the ring is rotating with the peripheral velocity $V_0 (= \delta x / \delta t)$, so that the magnetic potential energy in the surface layer of the recycling ring is constantly feeding to the entrance of the hot water portion wherein the magnetic field H is also applied, and the magnetic energy feeding per one second is really $V_0 \cdot M$.

When the hot water heat power is absorbed into the surface layer of the ferrite ring promptly, then the surface layer temperature approaches to $T_Q$ in $t_H$ in average, then the magnetic potential energy is lost in $t_H$ roughly, which is converted to a mechanical energy because while converting, the portion of the ferrite ring having the magnetic potential energy is in the magnetic field H with the velocity $V_0$. And the rate of conversion is giving the power corresponding to the energy, and the mechanical power delivered in the hot water portion is $P = V_0 \cdot M / t_H$ approximately. A complete derivation of the mechanical power had already given previously, but the treatment from the energy relation in the recycled mode operation will clarify the basic idea of the invention. It should be mentioned that the cooling portion must perform the restoring of magnetization in the cool cycle of the rotation.

The mechanical power delivered is proportional to $V_0$ while the surface layer temperature rise to near $T_Q$ is occurred in the hot water portion. For the high velocity $V_0$, the temperature rise is so small that the conversion of magnetic energy becomes incomplete, and then the mechanical power delivered decreases.

In the system previously explained, the thermal state of the ferrite ring had been given, hereby the magnetic states are shown:
(1) the magnetic field H = 1500 Oe
(2) the ferrite magnetic induction density-temperature characteristic at temperature lower than $T_Q$
  45°–53° C. . . . $\delta B / \delta T = 7.5$ gauss/°C.
  54°–58° C. . . . $\delta B / \delta T = 15$ gauss/°C.
  58°–65° C. . . . $\delta B / \delta T = 7.5$ gauss/°C.

Mn-Zn ferrite used has a rather poor characteristic that will be improved. Using NF = 10 ring ferrite bodies concentrically connected to a nonmagnetic plate, mechanical power is 1450 watt (calculated), heat power in is 30896 Kcal/hr, so heat efficiency is 0.3%, and heat power out is 2945 Kcal/hr, so net heat power efficiency is rather high. Experimental AC power generator output is about 700 watt.

Figure 4:
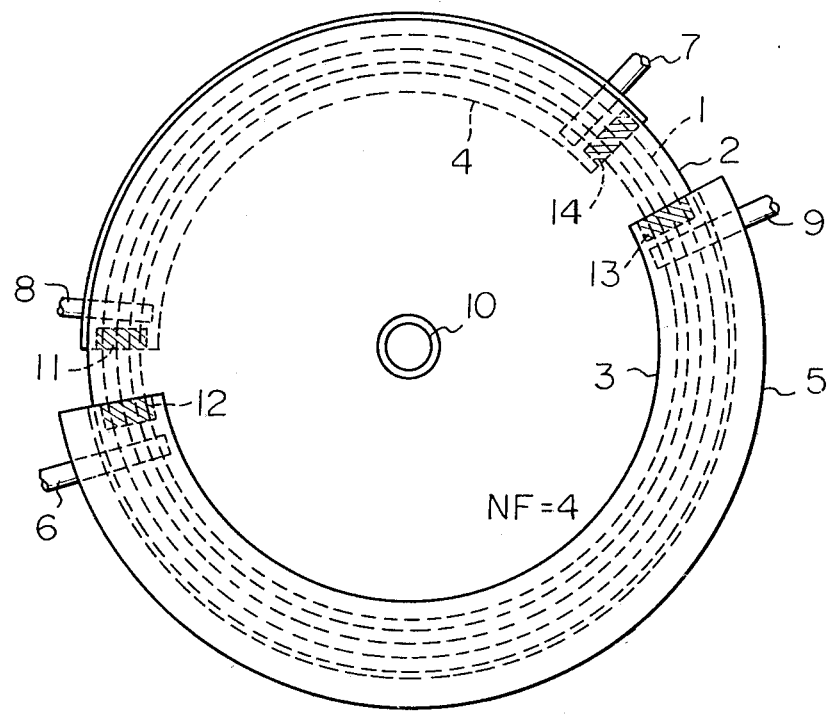
FIG. 4 shows a top view of the inventive high speed rotation ferrite ring scheme with the accompanied portions.

FIG. 4 shows a top view of the magnetic energy fast conversion ferrite ring engine that is the embodiment of the invention. In the figure, 1 is one of the thin ferrite rings that are concentrically affixed to a nonmagnetic circular plate 2 vertically. The shape of the ferrite ring is a long vertical cylinder of thin thickness. As it rotates through a hot water reservoir 3, the surface layer temperature rises resulting the surface layer magnetic energy fast decrease and surface layer power generation. A york 5 is enclosed outside of the heat reservoir 3, and the upper and lower spaces between the york and the hot water reservoir are occupied by paired magnets. 4 is a cool water reservoir, and the inlet 7 and the outlet 8 are provided.

The inlet 6 and the outlet 9 of the hot water reservoir 3 are used to flow in and flow out the hot water with a high flow rate and pressure head. 10 is a shaft that links external devices for starting, controlling and power delivering of the engine body.

Referring to FIG. 4, the hatched segments 11, 12, 13, and 14 are water seals that protect from water leakages.

Figure 5:
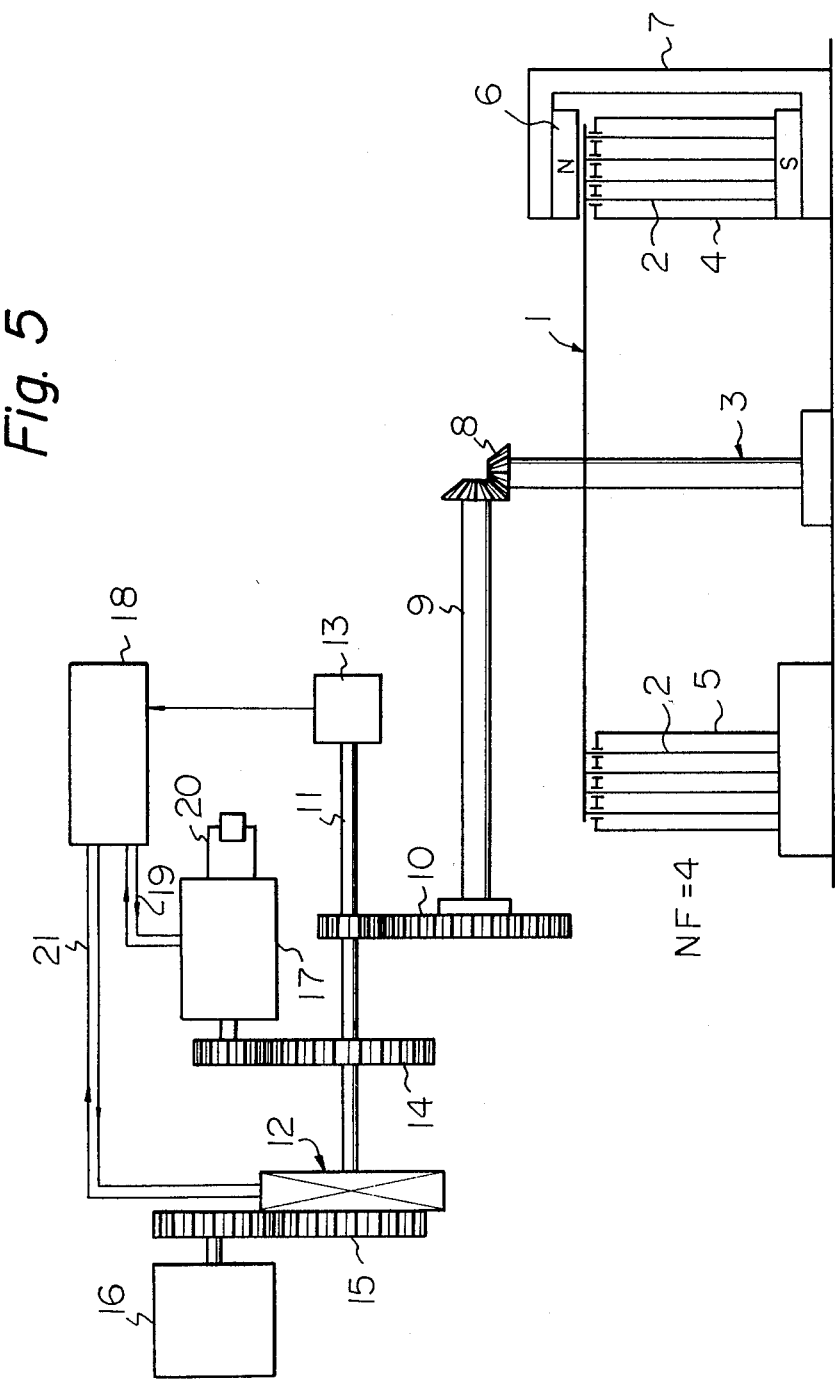
FIG. 5 shows an overall diagrammatic illustration with a cross-sectional view of the engine body.

FIG. 5 is a diagrammatic illustration with affixed apparatuses necessary for carrying out several embodiments of the present invention. In the right half of FIG. 5, a fragmentary sectional view of the magnetic energy fast conversion ferrite ring engine is illustrated. A nonmagnetic circular plate 1 is connected to a vertical shaft 3, and one end of the shaft is placed on a stand and the other end is connected to a bevel gear 8 which links to a horizontal rod 9 connecting to externally annexed apparatuses. The upper ends of ferrite rings are affixed by joints to the plate 1 concentrically. The lower ends of ferrite rings are put in the respective circular slot lines constructed in a hot water reservoir 4 and a cool water reservoir 5. The most inside ferrite ring is denoted by 2.

Thus the rotating portion comprising the plate 1 and the ferrite rings rotates smoothly.

Referring to FIG. 5, one of paired magnets 6 is set upside and slightly in separate to the plate 1 and the other is set under the hot water reservoir 4. A yoke 7 is provided between the paired magnets 6 and makes the stray magnetic field small and the air gap magnetic field where the ferrite rings are located strong.

Referring to FIG. 5, the horizontal rod 9 which rotates with rl rotation/sec is connected to a gear train 10 which speeds up the rotation with the gear ratio and is connected to a rod 11. A clutch 12, a tachogenerator 13, and a gear train 14 are linked to the rod 11. A gear train 15 is connected to the other side of the clutch 12. A starter motor 16 is connected to the gear train 15.

An electric power generator 17 is connected to the gear train 14. 18 is a controller which accepts signals from the tachogenerator 13, and provides appropriate control signals on output lines.

Output lines 19 issue a field control current of the electric power generator 17 which provides a counterbalance torque $T_G$ equal to the negative of the product of the gear ratio and a torque generated in the ferrite rings scheme, and provides an electric power $P_0$ at an output terminal 20 of the power generator 17.

Output lines 21 issue a control signal to the clutch 12. The clutch 12 is controlled by this signal such that, as the ferrite rings rotating scheme is constructed to prohibit self-starting rotation even if the thermal heat and cool schemes are ready to operate, which is the important feature of the invention. Therefore, when starting the scheme, the rotation of the starter motor 15 must be transferred through the gear train 15 and the clutch 12 to the rod 9, and when the ferrite ring rotation scheme enters into the power generating state, the clutch 12 must detach its frictional contact plates, and the starter motor 15 is left separated and stops its operation.

In this state, the electric power generator 17 controlled by its field current by means of the control lines 19 generates the countertorque that assures the constant velocity rotation of the ferrite rings scheme which is the embodiment of the invention.

Although not mentioned in FIG. 5, the controller 18 also performs thermal controls such as the hot and cool temperatures, flow rates, and pressure heads.

What is claimed is:

1. A magnetic energy recycling scheme which is a combination of first means for generating a mechanical power by magnetic energy recycling, and second means for starting the first means and keeping the first means in a stable power generatng state; the first means comprising one or plurality of thin circular rings of ferrite having the Curie temperature $T_Q$, a nonmagnetic plate to which said ferrite rings are affixed concentrically, providing a shaft to link with said second means, a hot water reservoir in which hot water must flow with a high flow rate, appropriate pressure head, and average temperature $T_H$ such that said hot water heat power flow being transferred to said ferrite rings surface layer raises said surface layer temperature rapidly near to $T_Q$, a cool water reservoir wherein cool water flowing having the same properties except average temperature $T_C$ lower than $T_Q$ is extracted heat power from said ferrite rings surface layer and restored said ferrite rings surface layer to be magnetizable, and a magnetic field generator located outside of said hot water reservoir providing a constant magnetic field H to the portion of said ferrite rings located in said hot water reservoir; and the second means comprising a starter motor connected through a clutch and gear trains to said shaft of said first means that lacks the function of self-starting, starting to rotate said ferrite rings through said hot and cool water reservoirs cyclically, generating a positive and negative temperature gradients in the temperature range less and near $T_Q$ in the surface layer of said ferrite rings, and then a consequent force being exerted on the part of said ferrite ring dipping in said hot water reservoir by said magnetic field H, and an electric power generator connected through gear trains to said shaft, soon beginning to generate a counter torque that balances the torque due to said force exerted in said first means, then keeping said circular ferrite rings in a constant peripheral velocity $V_0$, and holding a stationary positive and negative gradients of temperature along said circular ferrite rings surface layer, henceforth, said first means being entered in the magnetic recycling state, a continuous magnetic potential energy being generated in said rotating ferrite rings surface layer at the entrance portion of said hot water reservoir from said magnetic field H also applied there by said magnetic field generator, and converting promptly into a mechanical power within the average time $t_H$ as said magnetic energy being lost by a fast temperature rise to near $T_Q$ concerning to said ferrite rings surface layer, spatially said mechanical power being generated in the succeeding ferrite rings part dipping in said hot water; and further a controller governing said operations aforementioned.

2. A magnetic energy recycling engine structured according to claim 1, wherein working substances are composed of one or plurality of circular rings of magnetic material with higher saturation magnetic induction density, thermal conductivity, and the Curie temperature than those of the conventional ferrite; a heating portion wherein said working substance is a pressured vapour, or a vaporized gas having higher temperature than said Curie temperature; and a cooling portion wherein said working substance is a cool gas of lower temperature than said Curie temperature.

* * * * *